United States Patent
Yamada et al.

(10) Patent No.: US 9,977,996 B2
(45) Date of Patent: May 22, 2018

(54) CHARACTERIZING POROSITY DISTRIBUTION FROM A BOREHOLE IMAGE

(71) Applicant: SCHLUMBERGER TECHNOLOGY CORPORATION, Sugar Land, TX (US)

(72) Inventors: Tetsushi Yamada, Paris (FR); Daniel Quesada, Rueil Malmaison (FR); Isabelle Le Nir, Paris (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 30 days.

(21) Appl. No.: 14/897,733

(22) PCT Filed: Jun. 23, 2014

(86) PCT No.: PCT/US2014/043643
§ 371 (c)(1),
(2) Date: Dec. 11, 2015

(87) PCT Pub. No.: WO2014/209879
PCT Pub. Date: Dec. 31, 2014

(65) Prior Publication Data
US 2016/0155021 A1    Jun. 2, 2016

(30) Foreign Application Priority Data
Jun. 24, 2013    (EP) ..................................... 13305868

(51) Int. Cl.
*G06K 9/00*    (2006.01)
*G06K 9/62*    (2006.01)
(Continued)

(52) U.S. Cl.
CPC ........... *G06K 9/6232* (2013.01); *G01V 1/306* (2013.01); *G01V 1/50* (2013.01); *G06K 9/209* (2013.01);
(Continued)

(58) Field of Classification Search
CPC ........ G01V 1/306; G01V 1/50; G01N 24/081; G06T 2207/30181
See application file for complete search history.

(56) References Cited

U.S. PATENT DOCUMENTS

| 5,809,163 A | 9/1998 | Delhomme et al. |
| 6,272,232 B1 | 8/2001 | Delhomme et al. |

(Continued)

FOREIGN PATENT DOCUMENTS

| GB | 2404473 A | 2/2005 |
| RU | 2011143172 A | 4/2013 |

OTHER PUBLICATIONS

International Search Report and Written Opinion issued in corresponding International Application No. PCT/US2014/043643 dated Jan. 8, 2015.
(Continued)

*Primary Examiner* — Avinash Yentrapati
(74) *Attorney, Agent, or Firm* — Michael Dae

(57) ABSTRACT

Apparatus and methods for use with borehole image data to: delineate a dip and/or a fracture from the borehole image data; create a gap-filled image from the borehole image data; extract a fracture segment from the borehole image data; determine matrix information from the borehole image data; delineate a heterogeneity from the borehole image data; and analyze image porosity. The image porosity analysis is based on: the dip and/or fracture delineated from the borehole image data; the gap-filled image created from the borehole image data; the fracture segment extracted from the borehole
(Continued)

image data; the matrix information determined from the borehole image data; and the heterogeneity delineated from the borehole image data.

20 Claims, 11 Drawing Sheets

(51) Int. Cl.
G01V 1/30 (2006.01)
G01V 1/50 (2006.01)
G06K 9/20 (2006.01)
G06K 9/46 (2006.01)

(52) U.S. Cl.
CPC ......... *G06K 9/4633* (2013.01); *G06K 9/4638* (2013.01); *G06K 9/6267* (2013.01); *G06K 9/6298* (2013.01)

(56) References Cited

U.S. PATENT DOCUMENTS

| | | | |
|---|---|---|---|
| 6,714,871 B1 | 3/2004 | Xu et al. | |
| 2009/0259446 A1* | 10/2009 | Zhang | E21B 49/00 703/2 |
| 2009/0262603 A1* | 10/2009 | Hurley | G01V 11/00 367/86 |
| 2010/0312529 A1* | 12/2010 | Souche | E21B 43/26 703/2 |
| 2011/0091078 A1 | 4/2011 | Kherroubi et al. | |
| 2012/0221306 A1* | 8/2012 | Hurley | G01V 99/005 703/6 |
| 2012/0275658 A1* | 11/2012 | Hurley | G06T 7/0004 382/109 |

OTHER PUBLICATIONS

Akbar et al., "Unconventional approach to resolving primary and secondary porosity in Gulf carbonates from conventional logs and borehole images", SPE 87297 presented at the 9th Abu Dhabi International Petroleum Exhibition and Conference held in Abu Dhabi, U.A.E., Oct. 15-18, 2000.

Delhomme, "A Quantitative Characterization of Formation Heterogeneities Based on Borehole Image Analysis", SPWLA 33rd Annual Logging Symposium, Jun. 14-17, 1992.

Hurley et al., "Method to Generate Full-Bore Images Using Borehole Images and Multipoint Statistics", SPE 120671 presented at the SPE Middle East Oil and Gas Show and Conference, Bahrain, Bahrain, Mar. 15-18, 2009.

Hurley et al., "Quantification of Vuggy Porosity in a Dolomite Reservoir from Borehole Images and Core", SPE 49323 presented at the 1998 SPE Annual Technical Conference and Exhibition held in New Orleans, Louisiana, Sep. 27-30, 1998.

Kherroubi, "Automatic Extraction of Natural Fracture Traces from Borehole Images", Proceedings of the 19th International Conference on Pattern Recognition (ICPR 2008).

Newberry et al., "Analysis of Carbonate Dual Porosity Systems from Borehole Electrical Images", SPE 35158 presented at the Permian Basin Oil & Gas Recovery Conference held in Midland, Texas, Mar. 27-29, 1996.

Yamada et al., "Revisiting Porosity Analysis From Electrical Borehole Images: Integration of Advanced Texture and Porosity Analysis", SPWLA 54th Annual Logging Symposium, vol. 54, Jun. 22, 2013.

Zang, "Filter-Based Training Pattern Classification for Spatial Pattern Simulation", PhD dissertation, Stanford University, Stanford, California, USA, Mar. 2006.

\* cited by examiner

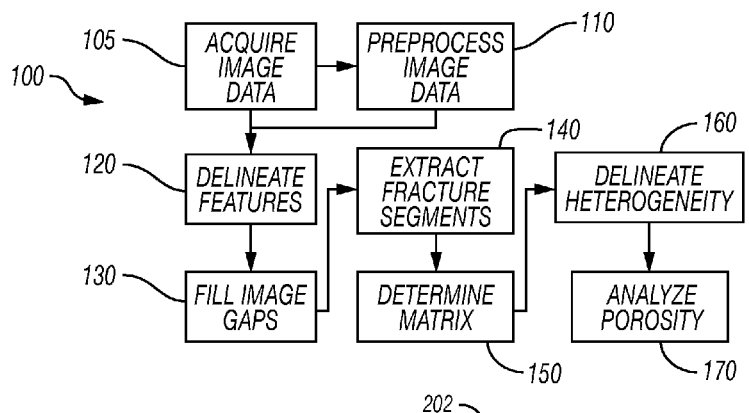
FIG. 1
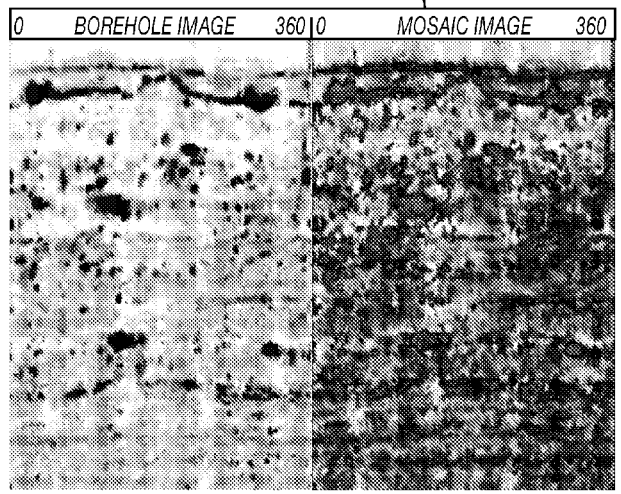
FIG. 2
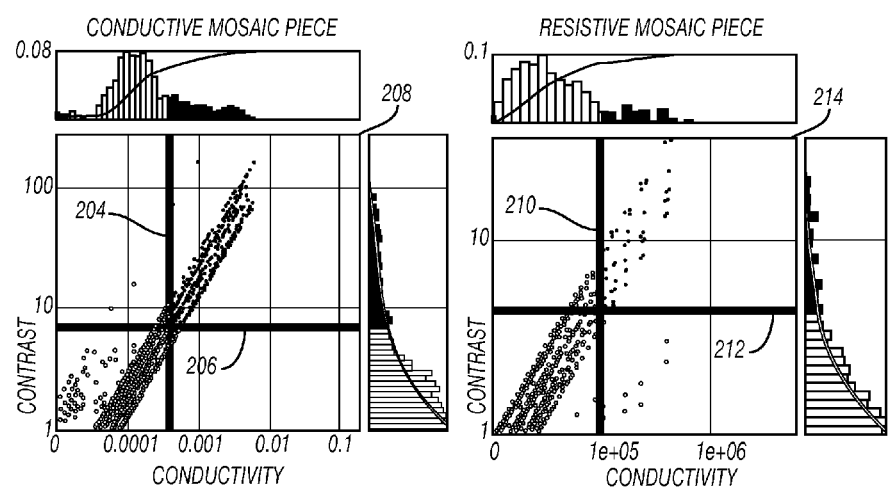

CHARACTERIZING POROSITY DISTRIBUTION FROM A BOREHOLE IMAGE

CROSS-REFERENCE TO RELATED APPLICATIONS

This application claims the benefit of and priority to European Provisional Application No. 13305868.5, entitled "Characterizing Porosity Distribution from a Borehole Image," filed Jun. 24, 2013.

BACKGROUND OF THE DISCLOSURE

Secondary porosity in carbonate rocks, primarily related to vugs and fractures, impacts fluid flow and recovery efficiency in subterranean reservoirs. The porosity system may be complex in carbonates where the distribution of primary and secondary porosity varies from facies-to-facies at different scales. Rapid changes in carbonate depositional environments may create different facies within a short vertical scale. The subsequent diagenesis processes, such as dissolution, cementation, and dolomitization, may alter each facies differently. In carbonate rocks, the diagenesis process may create vugs, which are cavities in the rock that are visible to the unaided eye. The vugs may be categorized as isolated vugs or connected (touching) vugs. Tectonic stress may also superimpose fracture networks to the subterranean formation. For the pore spaces connected to fractures, solution-enhanced bedding planes and vugs (vug-to-vug) may enhance the fluid flow, and are well related to increased oil recovery rates. On the contrary, the porosity related to isolated (separate) vugs may contribute little to permeability, and the permeability may be controlled by the amount of interparticle pore space of the matrix. Thus, characterizing the different pore spaces in complex reservoirs can be a challenge.

The accuracy of the evaluation of complex reservoirs has improved since the introduction of borehole image logging and subsequent interpretation workflows. One such implementation regards a method to analyze image texture by delineating conductive and resistive heterogeneities. Such implementation, however, may suffer shortcomings attributable to heterogeneities that are larger than the image pad width that are not detectable (in the case of pad imaging tools), the limited classification of heterogeneities, and the lack of one or more links to one or more reservoir parameters. Another method entails characterizing complex reservoirs utilizing micro-electrical borehole images, such as computing the porosity distribution by applying Archie's law to each value of the conductivity image over short vertical windows, and then splitting the distribution into vuggy or matrix pore space by one or more cutoff methods. However, the distribution relies on the cutoff method, such that vuggy porosity and fracture porosity are evaluated separately. Such method also cannot characterize the position in space and the geometrical properties of the vuggy zones.

SUMMARY OF THE DISCLOSURE

The present disclosure introduces acquiring borehole image data utilizing a downhole tool conveyed within a borehole extending into a subterranean formation. The downhole tool is in communication with surface equipment disposed at a wellsite surface from which the borehole extends. The downhole tool and/or the surface equipment is operable to: delineate a dip and/or a fracture from the acquired borehole image data; create a gap-filled image from the acquired borehole image data; extract a fracture segment from the acquired borehole image data; determine matrix information from the acquired borehole image data; delineate a heterogeneity from the acquired borehole image data; and analyze image porosity. The image porosity analysis is based on: the dip and/or fracture delineated from the acquired borehole image data; the gap-filled image created from the acquired borehole image data; the fracture segment extracted from the acquired borehole image data; the matrix information determined from the acquired borehole image data; and the heterogeneity delineated from the acquired borehole image data.

The present disclosure also introduces an apparatus comprising a downhole tool and surface equipment. The downhole tool is operable for conveyance within a borehole extending into a subterranean formation, and for acquiring borehole image data from within the borehole. The surface equipment is disposed at a wellsite surface from which the borehole extends, and is in communication with the downhole tool. At least one of the downhole tool and the surface equipment is operable to: delineate a dip and/or a fracture from the acquired borehole image data; create a gap-filled image from the acquired borehole image data; extract a fracture segment from the acquired borehole image data; determine matrix information from the acquired borehole image data; delineate heterogeneity from the acquired borehole image data; and analyze image porosity based on: the dip and/or fracture delineated from the acquired borehole image data; the gap-filled image created from the acquired borehole image data; the fracture segment extracted from the acquired borehole image data; the matrix information determined from the acquired borehole image data; and the heterogeneity delineated from the acquired borehole image data.

The present disclosure also introduces an apparatus comprising a processor, memory, and computer program code. The processor, the memory, and the computer program code are collectively operable to: delineate a dip and/or a fracture from borehole image data; create a gap-filled image from the borehole image data; extract a fracture segment from the borehole image data; determine matrix information from the borehole image data; delineate heterogeneity from the borehole image data; and analyze image porosity based on: the dip and/or fracture delineated from the borehole image data; the gap-filled image created from the borehole image data; the fracture segment extracted from the borehole image data; the matrix information determined from the borehole image data; and the heterogeneity delineated from the borehole image data.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 1 is a flow-chart diagram of at least a portion of a method according to one or more aspects of the present disclosure.

FIG. 2 depicts example heterogeneity delineation with cross-plots according to one or more aspects of the present disclosure.

DETAILED DESCRIPTION

Figure 3:
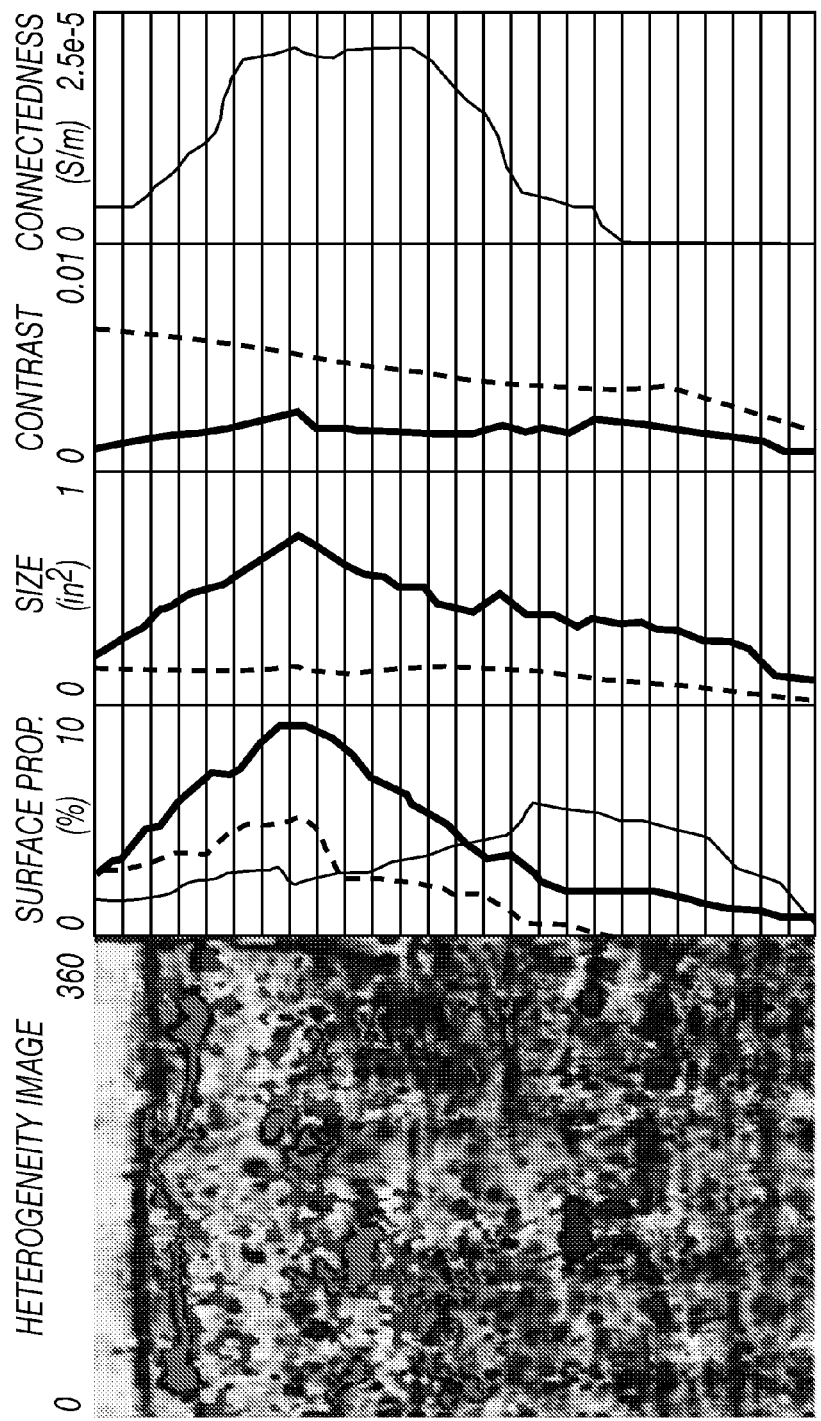
FIG. 3 depicts an example computed heterogeneity image and summary curves according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed.

Conventional logs may have a low vertical sampling rate compared to the porosity distribution, and may fail to accurately predict the production potential of the complex reservoirs. However, as described above, the accuracy of such predictions has improved since the introduction of micro-electrical borehole image logging and related interpretation workflows. Among the wireline borehole images possible, resistivity images may be obtained by finely mapping a resistivity property of the borehole wall. For example, the vertical and horizontal sampling rate may be about 2.54 mm (or about 0.1 inch) and the resolution (focusing zone) may be about 5.08 mm (or about 0.2 inch).

Electrical borehole images may be utilized not merely for structural modeling and stress interpretation, but also for image heterogeneity (i.e., texture) and porosity analysis. The heterogeneity observed in carbonates at the resolution of borehole imaging tool measurements may be related to the presence of macro or vuggy porosity in a matrix characterized by interparticle porosity. However, the geological and petrophysical properties at the borehole scale may be extended to the reservoir scale. Also, while several methods have been proposed to characterize heterogeneous carbonates with core and CT scans, the core data may not be acquired because it is costly.

Other previous proposals introduced methods for analyzing image texture by delineating conductive and resistive heterogeneities, including characterizing the geometry and electrical properties of each heterogeneous feature and their connectedness. Another existing proposal suggested methods for evaluating permeability by calibrating a connectedness index using conventional logs. Methods have also been proposed to compute the Archie cementation factor m utilizing the result of texture analysis. However, texture analysis does not directly define reservoir parameters, and may be limited by missing stripes related to particular electrical imaging tools. For example, borehole coverage may be incomplete due to the four-arm nature of the electrical imaging tools, such that four to eight stripes of missing information may be included on the borehole image. Additional proposals introduced methods for interpolating the existing information across the missing zones using multipoint statistics (MPS), and suggested utilizing such methods in texture analysis. Texture analysis captures conductive features, such as vugs or fractures, and classifies them into connected features and isolated features utilizing, for example, the crest line of the image.

One particular proposal introduced a method intended to better characterize carbonate reservoirs using electrical borehole imaging. This method computed the porosity distribution by applying Archie's law to each value of the conductivity image (calibrated from the electrical image) over short vertical windows, such that the distribution could then be split into vuggy or matrix pore space. The conversion from image value to porosity value was based on the Archie saturation equation for the flushed zone, set forth below as Equation (1):

$$S_{xo}^n = \frac{aR_{mf}}{\phi^m R_{xo}} \quad (1)$$

where $S_{xo}$ is the saturation of the flushed zone, $R_{mf}$ is the resistivity of the mud filtrate, $R_{xo}$ is the resistivity of the flushed zone, $\phi$ is the porosity, a depends on the tortuosity, m is the cementation factor, and n is the saturation exponent.

Assuming $S_{xo}=1.0$, $a=1.0$, and $m=n=2.0$, one can then obtain Equation (2), set forth below:

$$\phi_i = \sqrt{\frac{R_{mf}}{R_{xo}}} \quad (2)$$

where $\phi_i$ is the porosity at each pixel of the borehole image and $R_{xo}$ is the measured resistivity (inverse of conductivity) at each image pixel. Equation (2) can be rewritten as set forth below in Equation (3):

$$\phi_i = \phi_{ext}(R_{ext}C_i)^{1/m} \quad (3)$$

where $\phi_{ext}$ and $R_{ext}$ are the porosity and the shallow resistivity, respectively, from conventional logs, and $C_i$ is a value of the conductivity image. Once the conductivity values are converted to porosity, the borehole image can be treated as a porosity map. A split into primary and secondary porosity may be obtained by applying histogram cutoff methods. However, the distribution relies on the cutoff method and makes it impossible to evaluate vuggy porosity and fracture porosity separately. Another drawback is that the method cannot characterize the position in space and the geometrical properties of the vuggy zones.

The present disclosure introduces a method or workflow (100) comprising a grouping of several intertwined processes, as depicted in FIG. 1. One or more aspects of the workflow (100) may improve heterogeneity delineation methods within the scope of the present disclosure. The workflow (100) may incorporate raw acquisition data of a borehole image from wireline and/or while-drilling tools, and may be applicable or readily adapted for utilization with many properties of borehole images, although perhaps with the possible exception of how the borehole image is converted to a porosity image utilized in the image porosity analysis of the workflow described below.

The workflow (100) may comprise preprocessing (110) the raw image data. The preprocessing (110) may, for example, fix erratic values, match the image depth, and calibrate image values, among other preprocessing possibilities within the scope of the present disclosure. For example, after calibrating the image utilizing an external shallow resistivity log, the image may be treated as a conductivity map of the borehole wall. The borehole image may be displayed as a two-dimensional, unrolled map of the borehole, viewed from the inside. The lateral axis may be from zero to 360 degrees from North in vertical wells.

The workflow (100) may also comprise dip and fracture selection and/or other delineation (120). For example, bedding planes may be delineated on the image, such that properties computed on the image may be characterized along the bedding and/or the delineated heterogeneities may be classified utilizing the bedding planes during subsequent heterogeneity delineation (160). The delineation (120) may be referred to as dip picking.

The workflow (100) may also comprise gap-filled image creation (130). Wireline micro-resistivity imagers may have several pads connected to the tool by arms, and each pad may have laterally aligned sensors (electrodes). During data acquisition, the arms may open so that the pads can press against the sidewalls of the borehole, resulting in missing stripes between pads. The larger the borehole diameter, the larger the width of missing stripes. Thus, borehole coverage of certain borehole imaging tools may be incomplete. For example, the coverage may be about 80% in an eight-inch borehole. The stripes may complicate automatic processing of the image, such as during the subsequent fracture segment extraction (140) and heterogeneity delineation (160) described below. The texture analysis may provide satisfactory results when the heterogeneity size is smaller than the pad, but may become inaccurate when the size of the textural features exceeds the pad width. Moreover, automatic fracture detection may depend on fracture segments being extracted individually on each pad before being able to merge them into one single sinusoid. These processes may utilize a close quality-check by an interpreter, and consequently may not be fully automated. Generating an image in which the missing stripes are filled with appropriate data may reduce or remove such issues.

FILTERSIM and/or another multipoint statistics (MPS) and/or inpainting algorithm may be utilized to fill gaps in the image. Such algorithms may browse the image with a moving window and, for each position of the window, take a snapshot of the inner pattern. Patterns containing missing values may be discarded, and the others may be summarized and classified based on a number of scores, which may be obtained by applying a set of filters. The algorithm thus provides of a full pattern collection that may be utilized to populate the empty pixels of the image. The simulation may begin by patching the data of the initial image in a new, empty grid. The empty pixels of the grid may then be sequentially visited, perhaps in a random order. At each iteration, the same window as above is centered on the current pixel. The data present in the window is analyzed and compared with those of the previously collected patterns. The collection pattern that best matches the data originally present may then be selected and pasted at this specific location. This operation may then be repeated until the image is completely filled.

As described above, the workflow (100) may also comprise fracture segment extraction (140). On borehole images, fractures may appear as segments instead of sinusoids. An automatic or other segment extraction method may allow segments to be extracted based on, for example, mathematical morphology techniques.

That is, fracture segment extraction may be performed as a preliminary measure to identify the porosity associated with fractures. The segment extraction method, which may be based on mathematical morphology theory, may permit separately extracting the low apparent dip fracture segments (e.g., apparent dip below 45 degrees) and the high apparent dip segments (e.g., apparent dip above 45 degrees). The initial conductivity map may be seen in this framework as a geographic surface with crests and troughs.

In the low apparent dip extraction, the image may be browsed with a vertical linear structural element (e.g., 5 pixels high, 1 pixel wide), and the troughs that are smaller than the size of the structural element may be filled. This morphological operation may be referred to as closing. The image may then be browsed with a second vertical structural element (e.g., 20 pixels high, 1 pixel wide). The crests that are smaller than the size of this structural element may then be removed from the image. This morphological operation may be referred to as opening. The small, isolated, high-conductivity features may then be obtained by determining the residue between the resulting image and the initial image. A threshold may then be applied. For example, 20% of the highest-conductivity pixels may be kept, and the other 80% may be discarded. This image may now be ready to be analyzed. A connected-component labeling algorithm may be utilized to identify and attribute an index to the remaining pixel groups. The groups with an area smaller than a predefined value (e.g., a 20-pixel area) may then be removed, as these may be related to texture or measurement artifacts. Each pixel group may then be best-fitted with a sinusoid, which may be split into several segments. The principle may remain the same for the high apparent dip extraction, except that the initial image may be transposed at the start (such as to utilize the same vertical structural element as in the previous case), and that the polyline may no longer be sinusoidal. A quality check may also be performed to ensure that each segment superimposed on one or more vugs, bedding planes, or acquisition artifacts is fully suppressed.

The workflow (100) may also comprise matrix extraction or determination (150). For example, the background of the image, which may correspond to the geological term matrix, may be computed by removing non-crossing features on images, such as vugs, molds, fracture segments, and intra-formational conglomerates, perhaps by utilizing a grayscale reconstruction transform. For example, vertical artifacts caused by button malfunctioning and erratic spike data may have previously been smoothed by the morphological opening method described above. The grayscale reconstruction transform may remove the features not traversing the image. Two input images may be prepared, including a mask image f (which may be the original image) and a marker image g. To remove conductive (e.g., high value) heterogeneities, the marker image g may be set lower than the mask image f (e.g., for each pixel p∈$D_1$, f (p)≥g (p)) and the marker image g may be dilated under the mask image f until stability is reached. Resistive heterogeneities may be removed symmetrically. For example, the marker image g may be set higher than the mask image f (e.g., f (p)≤g (p)), and the marker image g may be eroded over the mask image f until stability is reached. The erosion and dilation may be performed such that the features traversing in any direction are preserved as matrix. In this way, conductive heterogeneities may be removed first, and then resistive heterogeneities, leaving the matrix information.

A curve representing a property (e.g., electrical conductivity, resistivity, etc.) of the matrix information may also be determined by averaging the matrix information with respect to depth in the borehole. Such curve may be utilized in various manners, such as for sequence analysis, because it may have finer resolution and/or sampling rate compared to conventional resistivity logs.

As described above, the workflow (100) may also comprise heterogeneity delineation (160). For example, conductive and/or resistive heterogeneities may be delineated on the image (perhaps automatically) utilizing one or more thresholds on contrast (against matrix) and value. The geometry and electrical properties of each heterogeneous feature, and the intensity of their connectedness, may thus be characterized.

The borehole image may be characterized utilizing the computed matrix image. The entire image may be segmented by the watershed transform, such as to efficiently characterize the image property. The watershed transform is an image segmentation method that can be visually explained by a topographic notion. First, a hole is bored at each local minimum on the surface (e.g., image), and the surface is immersed in a lake with a uniform vertical speed. The water entering through each hole fills up the various catchment basins. Dams may be built along the lines where the floods would merge. After completing the immersion, the dams emerge and separate the various catchment basins. A catchment basin is a segment of the image, which may be referred to as a mosaic piece. The watershed transform may be applied to the gradient image generated from the original image. Each mosaic piece may be characterized by their attributes, such as the peak/valley value, contrast against matrix image, size, and type. The mosaic pieces may be of a conductive type, assigned to the mosaic pieces above the matrix image, or of a resistive type, assigned to the mosaic pieces below the matrix image. To examine the connectedness between conductive heterogeneities, crest lines may be extracted by applying the watershed transform to the original image, and lines lower than a cut-off image may be removed.

FIG. 2 depicts example interactive heterogeneity delineation with cross-plots. As depicted in the example of FIG. 2, mosaic pieces may be delineated in a mosaic image track 202 by setting a conductivity cutoff value 204 and corresponding contrast cutoff value 206 for each conductive piece in the conductive cross-plot 208, and by setting a resistivity cutoff value 210 and corresponding contrast cutoff value 212 for each resistive piece in the resistivity cross-plot 214. One dot in each cross-plot 208 and 214 may correspond to one mosaic piece in the mosaic image track 202. Thus, the highlighted mosaic pieces in the cross-plots 208 and 214 may be displayed in the mosaic image track 202.

FIG. 3 depicts an example computed heterogeneity image and summary curves according to one or more aspects of the present disclosure. By setting appropriate cutoff values on values and contrast attributes of mosaic pieces on a facies-by-facies basis, the mosaic pieces may be delineated based on the conductive and resistive features. Neighboring mosaic pieces may then be merged (perhaps automatically) to form a heterogeneity feature. Conductive heterogeneity spots may be sub-classified, utilizing crest lines, fracture segments, and/or bed boundaries, into connected and/or isolated fracture and/or bed boundary types. For example, spots connected by crest lines to another spot may be classified as connected spots, whereas spots connected to fractures may be fracture spots, and spots aligned along bed boundaries may be bed boundary spots. The rest may be classified as isolated conductive spots. Size, contrast, and surface proportion of each spot/heterogeneity category may be computed and represented as curves. The connectedness curve may be defined by the average of the differences between matrix and crest line (which may be zero if there is no line) at each depth level. The curves may be smoothed with, for example, a one-foot sliding window, although other implementations within the scope of the present disclosure may utilize additional or other smoothing techniques.

Figure 4:
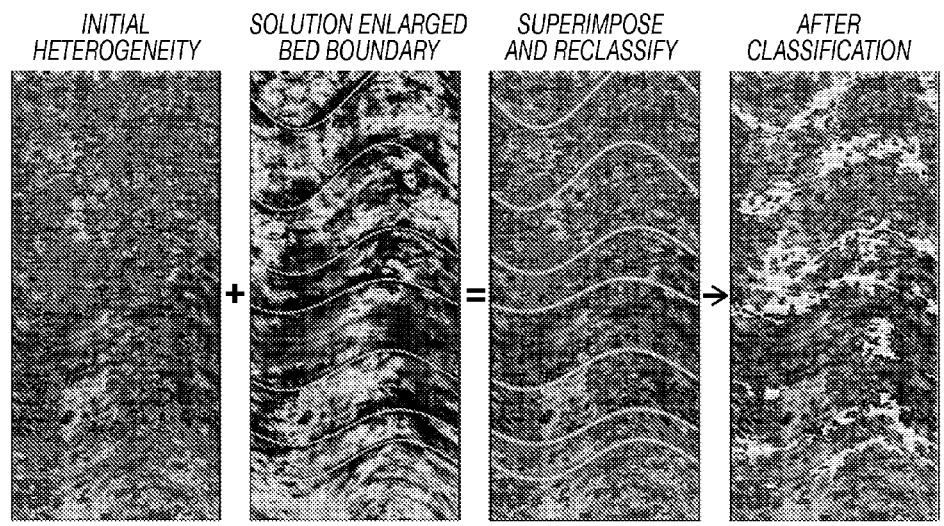
FIG. 4 depicts an example of classification of a heterogeneity image utilizing a manually or automatically delineated and solution-enlarged or solution-enhanced bed boundary according to one or more aspects of the present disclosure.
Figure 5:
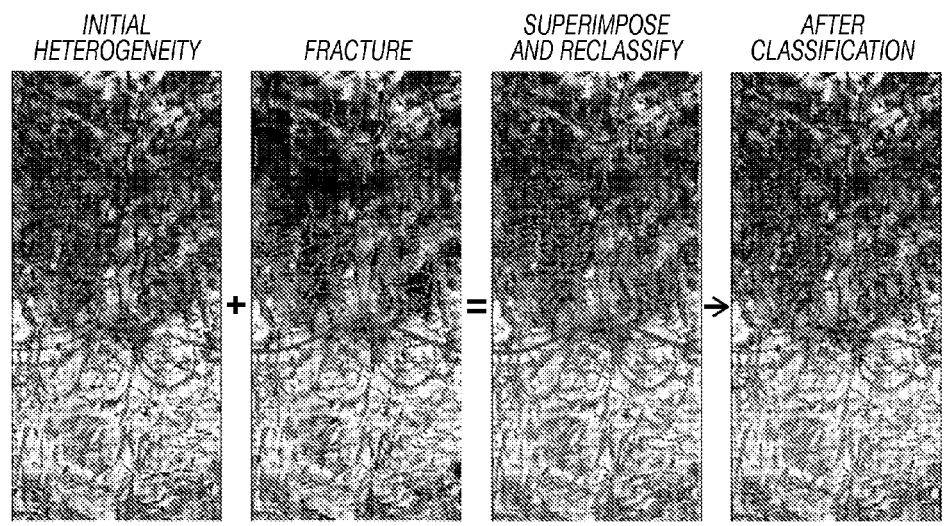
FIG. 5 depicts an example of classification of a heterogeneity image utilizing fracture traces and a manually or automatically delineated fracture dip according to one or more aspects of the present disclosure.

The heterogeneity delineation (160) may comprise superimposing outputs from the actions described above (e.g., manually or automatically delineated fracture traces, bed boundaries, etc.) on the heterogeneity image, such that it may be possible to classify (perhaps automatically) the full range of the heterogeneities, as depicted in FIGS. 4 and 5. FIG. 4 depicts example classification of the heterogeneity image utilizing a manually delineated, solution-enlarged bed boundary according to one or more aspects of the present disclosure. FIG. 5 depicts example classification of the heterogeneity image utilizing fracture traces and a manually delineated fracture dip. Heterogeneities may (by default or otherwise) correspond to local changes in porosity relative to the matrix such that, for example, high conductive heterogeneities may correspond to porous zones (e.g., vug, fracture, etc.) and low conductive heterogeneities may correspond to cemented zones. The heterogeneity image may be refined (by users or otherwise) to identify and/or ignore conductive features not corresponding to pore space (e.g., clay and conductive minerals, breakouts, and induced fractures, among others) and not considered as high-porosity zones in the subsequent image porosity analysis (170). The heterogeneity delineation (160) may also comprise characterizing large heterogeneities, perhaps more accurately than with previous methods due to, for example, one or more aspects of the gap-filling described above.

As described above, the workflow (100) may also comprise image porosity analysis (170). For example, one or more equations and/or other tools operable to determine the porosity image from a borehole image having the conductivity property may be utilized in determining the porosity map. An example is set forth above as Equation (3).

Figure 6:
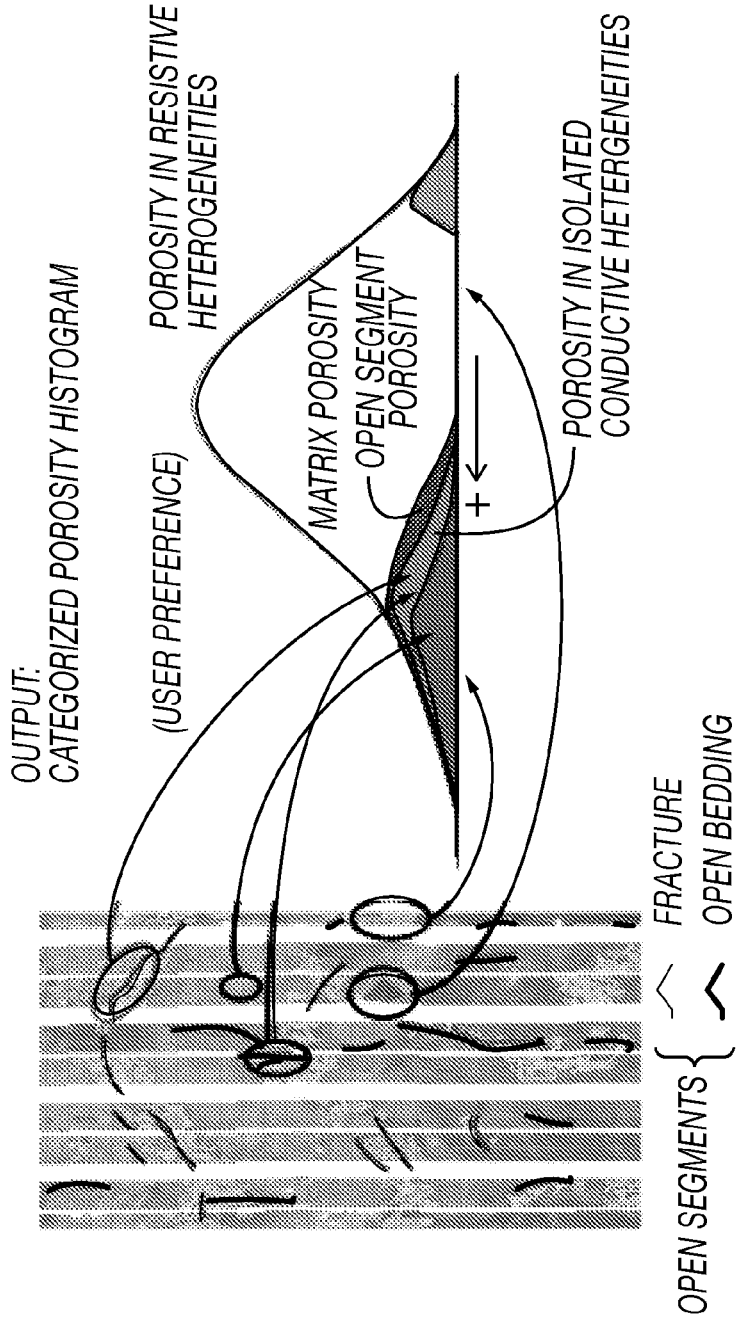
FIG. 6 depicts an example porosity distribution, by type, according to one or more aspects of the present disclosure.

To distribute the porosity values, the porosity map may be associated with the heterogeneities determined during the previous heterogeneity delineation (160) to classify the porosity values. For example, a value in the porosity image that corresponds to a connected conductive vug in the heterogeneity image may be classified as porosity from the connected conductive vug. A pore space may be a conductive heterogeneity, but a conductive heterogeneity may not be a pore space. Thus, the heterogeneity image may be refined with local geological knowledge so that clay, conductive minerals, breakouts, and/or induced fractures (which may be a high conductive zone but not true pore space) are not considered high porosity zones. A related example according to one or more aspects of the present disclosure is depicted in FIG. 6.

The image total porosity may be given by Equation (4), set forth below:

$$\phi_{ImageTotal} = \frac{1}{I}\sum_{i=1}^{I} \phi_i = \frac{1}{I}\sum_{T=1}^{T}\sum_{i \in t} \phi_i \quad (4)$$

where I corresponds to the number of the image column, and t represents each texture class. The image total porosity may follow the global trend of the external porosity when the image calibration is successful.

The contribution of each porosity type to the total image porosity may be as set forth below in Equation (5):

$$\phi(t)_{contribution} = \frac{1}{I}\sum_{i \in t} \phi_i \quad (5)$$

The average porosity of each porosity type may be as set forth below in Equation (6):

$$\phi(t)_{ave} = \frac{1}{I(t)}\sum_{i \in t} \phi_i \quad (6)$$

where I(t) is the total number of pixels of the porosity type.

Figure 7:
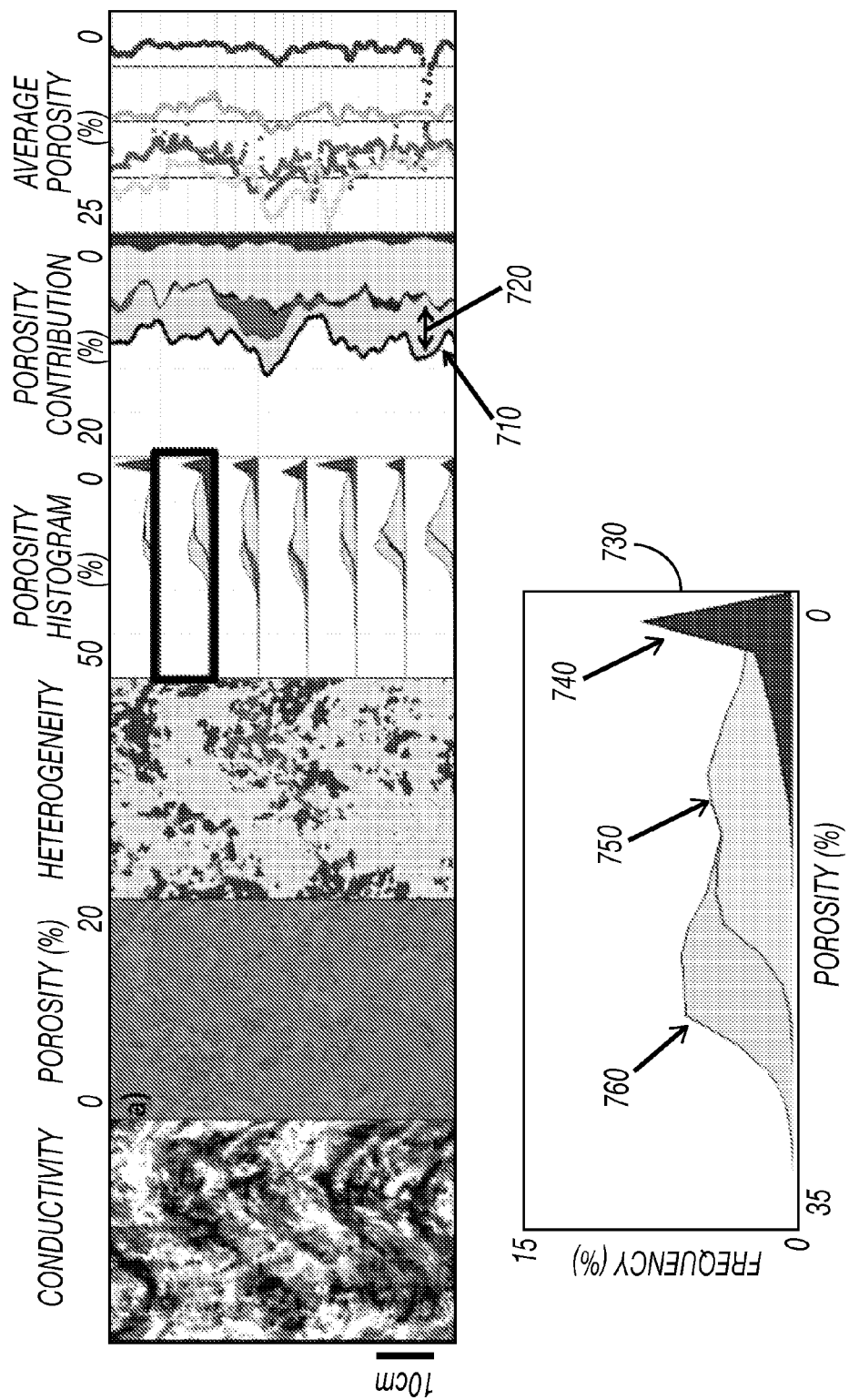
FIG. 7 depicts example results of image porosity distribution according to one or more aspects of the present disclosure.

As depicted in FIG. 7, the histograms of each porosity type may be created over vertical windows (along the borehole depth) and stacked in the same track. The example shown FIG. 7 depicts the image total porosity 710 and the contribution 720 from porosity connected to a solution-enlarged bed. FIG. 7 also comprises an example frequency vs. porosity plot 730, which depicts a histogram 740 of porosity at resistive heterogeneities, a histogram 750 of porosity at the matrix, and a histogram 760 of porosity connected to the solution-enlarged boundary.

The following description presents the implementation of one or more aspects described above in several examples.

Figure 8:
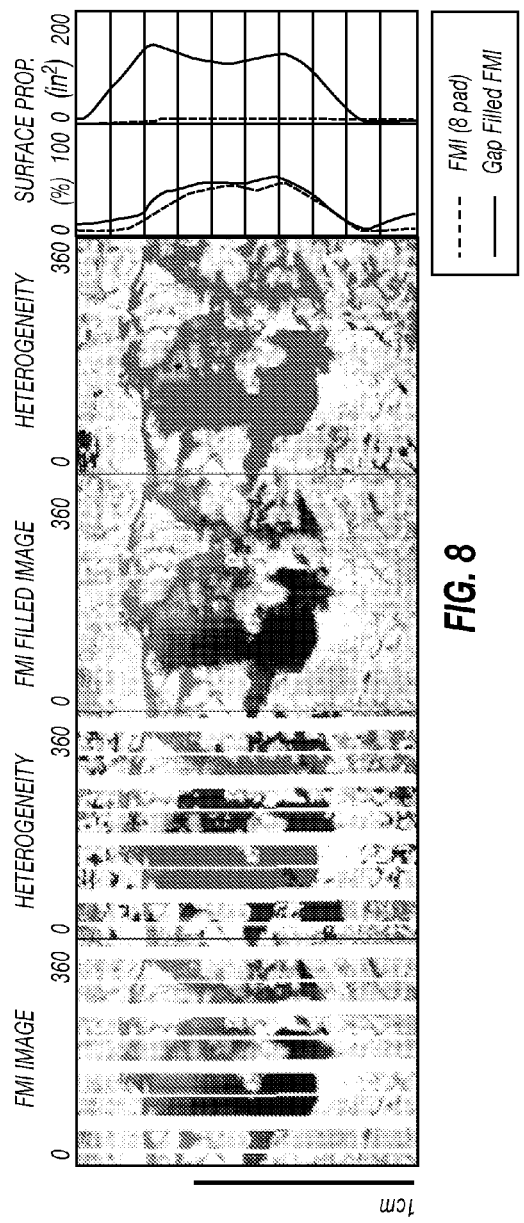
FIG. 8 depicts example computed sizes of heterogeneity features on both non-filled and gap-filled images according to one or more aspects of the present disclosure.

The first example relates to situations in which the conductive heterogeneity is larger than the pad width. A limitation of existing heterogeneity delineation methods regards the size (surface) of the delineated features not being accurately computed as the result of missing stripes between pad images when the feature is larger than the pad width, which results in medium size heterogeneities. As depicted in FIG. 8, it may be possible to (perhaps almost or substantially ideally) capture the size of the features as a result of the gap-filling method. There may be a small difference in surface proportion, but karst size may be better characterized with the gap-filled image.

In FIG. 8, the first (left) frame depicts an example imaging tool image, and the second frame depicts an example heterogeneity image computed from the imaging tool image. The third frame depicts an example gap-filled imaging tool image, and the fourth frame depicts a heterogeneity image computed from the gap-filled imaging tool image. The fifth frame depicts example surface proportion and size property curves. The curves may be smoothed with, for example, a vertical sliding window, although other implementations within the scope of the present disclosure may utilize additional or other smoothing techniques.

Figure 9:
FIG. 9 depicts example connected and isolated vuggy pore space computed utilizing heterogeneity delineation according to one or more aspects of the present disclosure.

The second example relates to isolated and connected conductive features. Characterizing the texture may comprise determining whether or not the delineated conductive features are connected. The crest line of the image may aid in identifying isolated and connected conductive features. As depicted in FIG. 9, if the delineated conductive heterogeneous feature is bridged to another one by a crest line, it may be classified as connected. FIG. 9 depicts example connected and isolated vuggy pore space computed utilizing heterogeneity delineation according to one or more aspects of the present disclosure, where yellow paths depict the connecting paths between conductive heterogeneities. The contribution of the porosity from both connected and isolated vug types to the total image porosity may be in the image porosity computation, as depicted in FIG. 7.

Figure 10:
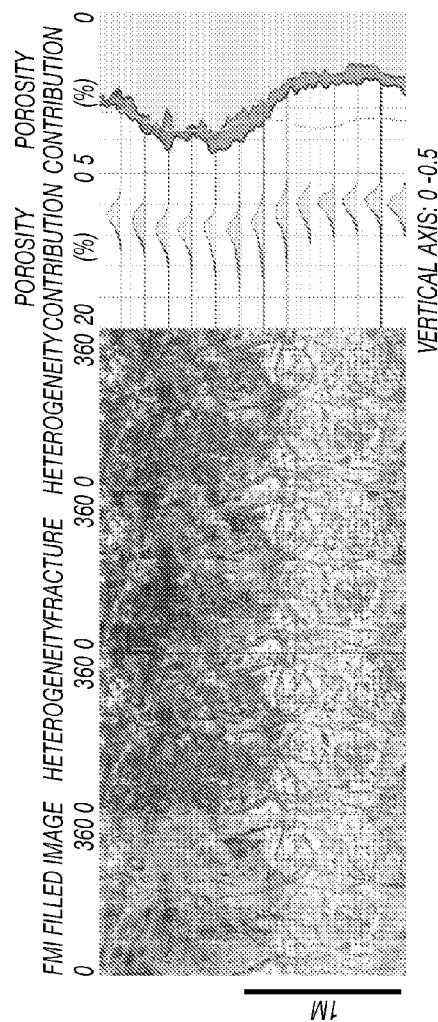
FIG. 10 depicts an example of sub-classifying fracture connected heterogeneity according to one or more aspects of the present disclosure.

The third example relates to conductive heterogeneity at and/or connected to fractures. Conductive heterogeneities may be detected along fractures in fractured facies, and part of the conductive heterogeneities may be connected to a fracture in vuggy and fractured facies. These conductive features may be sub-classified as being of the fracture type utilizing previously delineated fracture planes and segments. This separation process may entail preparing the heterogeneity image and the fracture image, as depicted in FIG. 10. If fracture planes or segments touch the conductive features, the conductive features may also be classified as the fracture type. The reclassified image may permit the distribution of the porosity to the fracture category in the porosity computation. A small porosity contribution from fractures may lead to good fluid production, perhaps even if the formation total porosity is low.

In FIG. 10, the first (left) frame depicts an example gap-filled borehole image, and the second frame depicts an example heterogeneity image. The third frame depicts example fractures, perhaps including semi-automatically computed segments and/or manually picked sinsoids, and the fourth frame depicts an example sub-categorized heterogeneity image utilizing the heterogeneity and fracture images. The fifth and sixth frames depict example results of the image porosity computation utilizing the sub-classified heterogeneity image.

Figure 11:
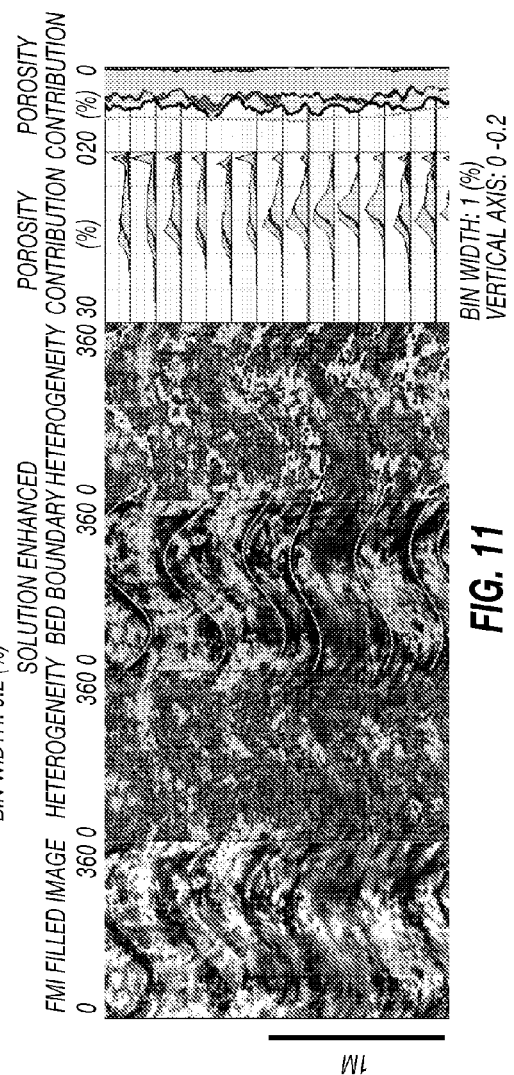
FIG. 11 depicts an example of sub-classifying fracture connected heterogeneity according to one or more aspects of the present disclosure.

The fourth example relates to conductive heterogeneity at a solution-enhanced bed boundary. Conductive features aligned at solution-enhanced bed boundaries may be considered to be more permeable than an isolated or connected pore space. Thus, it may be of value to classify this pore space. The delineated conductive features touched by a bedding plane may be sub-classified in a manner similar to that described above with the third example. FIG. 11 depicts an example according to one or more aspects of the present disclosure.

In FIG. 11, the first (left) frame depicts an example gap-filled borehole image, and the second frame depicts an example heterogeneity image. The third frame depicts an example of manually picked bed boundaries categorized as solution-enhanced, and the fourth frame depicts an example sub-categorized heterogeneity image utilizing heterogeneity and bed boundaries. The fifth and sixth frames depict example results of the image porosity computation utilizing the sub-classified heterogeneity image.

Figure 12:
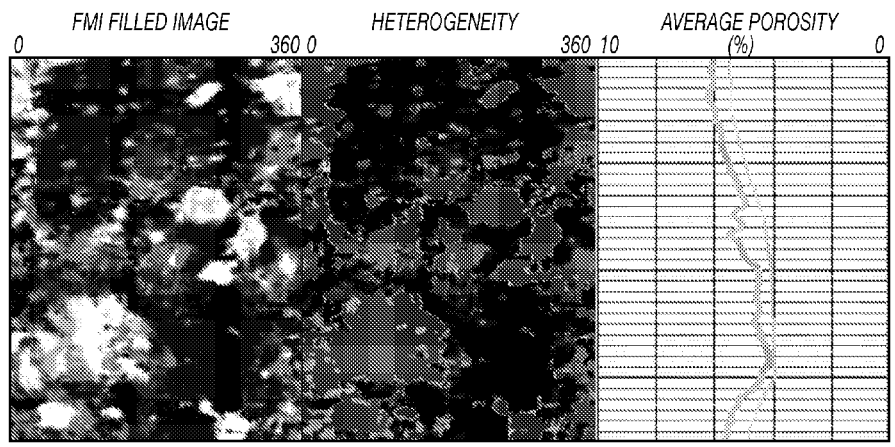
FIG. 12 depicts an example computed average porosity according to one or more aspects of the present disclosure.

The fifth example relates to matrix porosity. In certain environments (e.g., carbonates in the absence of connected pore space and conglomerate layers), the property of the matrix may be a permeability indicator. By delineating the heterogeneous features, it may be possible to extract the average porosity of the matrix, the area surrounding heterogeneities. FIG. 12 depicts an example according to one or more aspects of the present disclosure. The matrix porosity computed after delineating heterogeneities may show more accurate matrix porosity compared to merely converting the matrix conductivity curve to matrix porosity (e.g., through Equation (3)).

Figure 13:
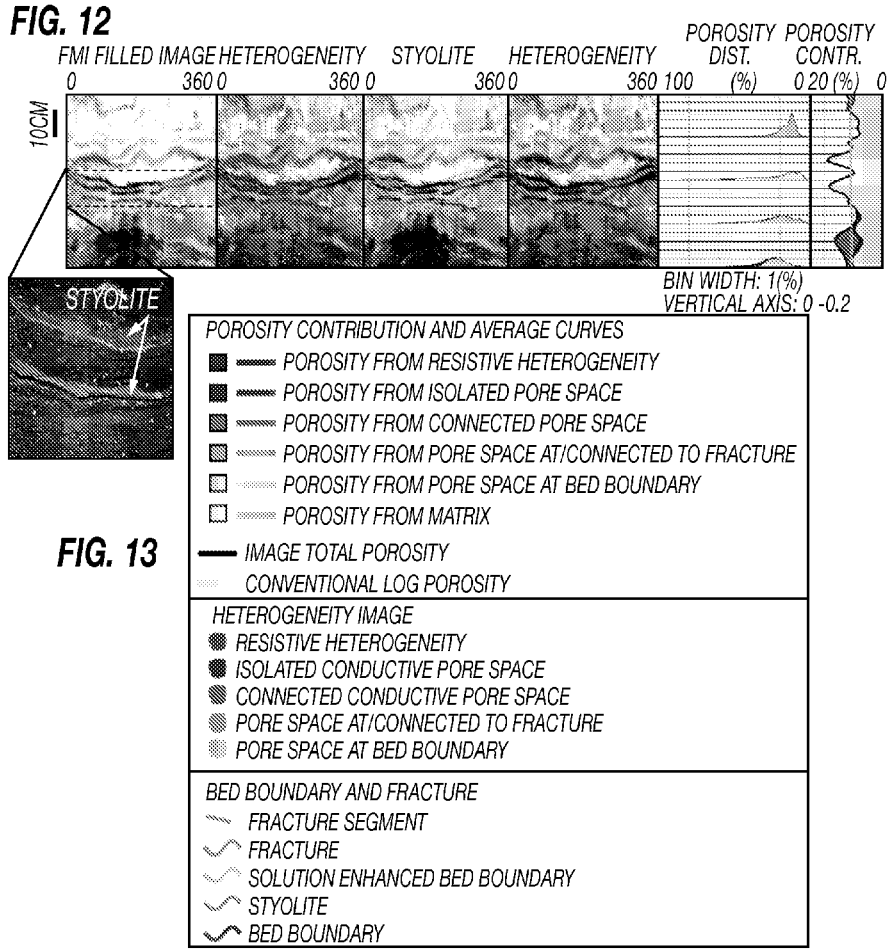
FIG. 13 depicts an example exclusion of conductive heterogeneities at clay-filled stylolites according to one or more aspects of the present disclosure.

The sixth example relates to non-porous conductive features. Conductive heterogeneous features can sometimes be aligned with non-porous conductive features, such as where they are located at clay-filled stylolites. With local geology knowledge, it may be possible to exclude them from the porosity analysis, where heterogeneities touched by the boundary previously classified as stylolite may be ignored in the porosity computation. FIG. 13 depicts an example according to one or more aspects of the present disclosure. It may also be possible to exclude conductive heterogeneity features aligned with breakouts, induced fractures, and/or conductive minerals (e.g., pyrite) from the porosity determination by interactively reclassifying them into non-porous conductive features before the porosity computation.

In FIG. 13, the first (left) frame depicts an example gap-filled borehole image, and the second frame depicts an example heterogeneity image. The third frame depicts an example manually picked stylolites, and the fourth frame depicts an example heterogeneity image refined by removing the conductive heterogeneities at stylolites. The fifth and sixth frames depict example results of the image porosity computation utilizing the refined heterogeneity image.

The workflow (100) depicted in FIG. 1 may also be performed in an order other than as shown in FIG. 1. For example, the gap-filled image creation (130) may be performed before to the dip and fracture delineation (120). Of course, other implementations of the order of activities performed in the workflow (100) are also within the scope of the present disclosure.

Figure 14:
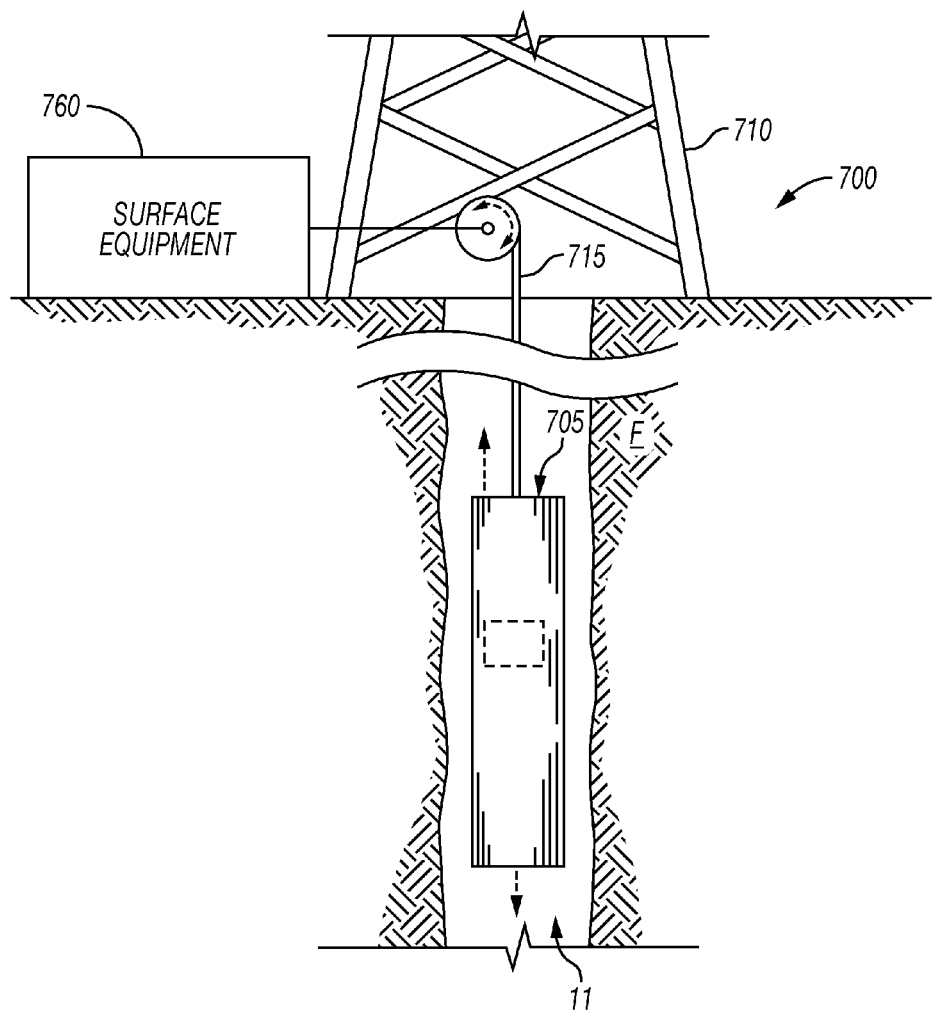
FIG. 14 is a schematic view of at least a portion of apparatus according to one or more aspects of the present disclosure.

FIG. 14 is a schematic view of an example imaging system 700 that may be employed onshore and/or offshore according to one or more aspects of the present disclosure, representing an example environment in which one or more aspects described above may be implemented. As depicted in FIG. 14, a downhole tool 705 may be suspended from a rig 710 in a borehole 11 formed in one or more subterranean formations F. The downhole tool 705 may be or comprise an acoustic tool, a conveyance tool, a density tool, an electromagnetic (EM) tool, a formation evaluation tool, a magnetic resonance tool, a monitoring tool, a neutron tool, a nuclear tool, a photoelectric factor tool, a porosity tool, a reservoir characterization tool, a resistivity tool, a seismic tool, a surveying tool, and/or a telemetry tool, although other downhole tools are also within the scope of the present disclosure.

The downhole tool 705 may be deployed from the rig 710 into the borehole 11 via a conveyance means 715, which may be or comprise a wireline cable, a slickline cable, and/or coiled tubing, although other means for conveying the downhole tool 705 within the borehole 11 are also within the scope of the present disclosure. As the downhole tool 705 operates, outputs of various numbers and/or types from the downhole tool 705 and/or components thereof (one of which is designated by reference numeral 720) may be sent via, for example, telemetry to a logging and control system and/or other surface equipment 760 at surface, and/or may be stored in various numbers and/or types of memory for subsequent recall and/or processing after the downhole tool 705 is retrieved to surface. The downhole tool 705 and/or one or more components 720 thereof may be utilized to perform at least a portion of a method according to one or more aspects of the present disclosure.

Figure 15:
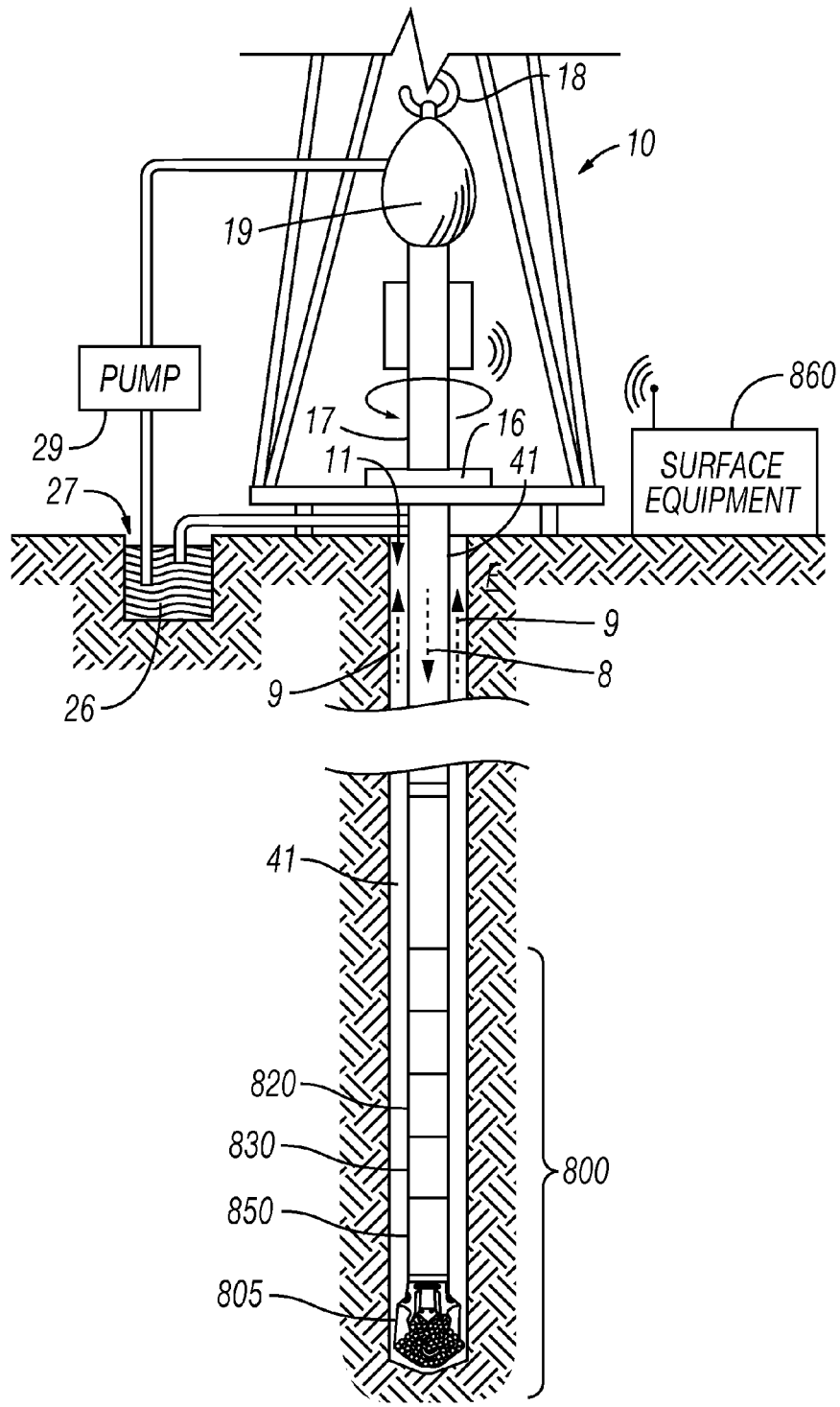
FIG. 15 is a schematic view of at least a portion of apparatus according to one or more aspects of the present disclosure.

FIG. 15 is a schematic view of an example wellsite system that can be employed onshore and/or offshore, perhaps including at the same wellsite as depicted in FIG. 14, where the borehole 11 may have been formed in the one or more subsurface formations F by rotary and/or directional drilling. As depicted in FIG. 15, a conveyance means 12 suspended within the borehole 11 may comprise or be connected to a bottom hole assembly (BHA) 800, which may have a drill bit 805 at its lower end. The conveyance means 12 may comprise drill pipe, wired drill pipe (WDP), tough logging conditions (TLC) pipe, coiled tubing, and/or other means of conveying the BHA 800 within the borehole 11.

The surface system at the wellsite may comprise a platform and derrick assembly 10 positioned over the borehole 11, where such derrick may be substantially similar or identical to the rig 710 shown in FIG. 14. The assembly 10 may include a rotary table 16, a kelly 17, a hook 18, and/or a rotary swivel 19. The conveyance means 12 may be rotated by the rotary table 16, energized by means not shown, which may engage the kelly 17 at the upper end of the conveyance means 12. The conveyance means 12 may be suspended from the hook 18, which may be attached to a traveling block (not shown), and through the kelly 17 and the rotary swivel 19, which permits rotation of the drillstring 12 relative to the hook 18. Additionally, or instead, a top drive system may be used.

The surface system may also include drilling fluid 26, which is commonly referred to in the industry as mud, stored in a pit 27 formed at the well site. A pump 29 may deliver the drilling fluid 26 to the interior of the conveyance means 12 via a port (not shown) in the swivel 19, causing the drilling fluid to flow downwardly through the conveyance means 12 as indicated by the directional arrow 8. The drilling fluid 26 may exit the conveyance means 12 via ports in the drill bit 805, and then circulate upwardly through the annulus region between the outside of the conveyance means 12 and the wall of the borehole 11, as indicated by the directional arrows 9. The drilling fluid 26 may be used to lubricate the drill bit 805, carry formation cuttings up to the surface as it is returned to the pit 27 for recirculation, and/or create a mudcake layer (not shown) on the walls of the borehole 11. Although not pictured, one or more other circulation implementations are also within the scope of the present disclosure, such as a reverse circulation implementation in which the drilling fluid 26 is pumped down the annulus region (i.e., opposite to the directional arrows 9) to return to the surface within the interior of the conveyance means 12 (i.e., opposite to the directional arrow 8).

The BHA 800 may include various numbers and/or types of downhole tools, schematically depicted in FIG. 15 as tools 820, 830, and 850. Examples of such downhole tools include an acoustic tool, a density tool, a directional drilling tool, a drilling tool, an EM tool, a formation evaluation tool, a gravity tool, a logging while drilling (LWD) tool, a magnetic resonance tool, a measurement while drilling (MWD) tool, a monitoring tool, a neutron tool, a nuclear tool, a photoelectric factor tool, a porosity tool, a reservoir characterization tool, a resistivity tool, a seismic tool, a surveying tool, a telemetry tool, and/or a tough logging condition (TLC) tool, although other downhole tools are also within the scope of the present disclosure. One or more of the downhole tools 820, 830, and 850 may be utilized to perform at least a portion of a method according to one or more aspects of the present disclosure.

The downhole tools 820, 830, and/or 850 may be housed in a special type of drill collar, as it is known in the art, and may include capabilities for measuring, processing, and/or storing information, as well as for communicating with the other downhole tools 820, 830, and/or 850, and/or directly with a logging and control system and/or other surface equipment 860. Such communication may utilize any conventional and/or future-developed two-way telemetry system, such as a mud-pulse telemetry system, a wired drill pipe telemetry system, an electromagnetic telemetry system, and/or an acoustic telemetry system, among others within the scope of the present disclosure. One or more of the downhole tools 820, 830, and/or 850 may also comprise an apparatus (not shown) for generating electrical power for use by the BHA 800. Example devices to generate electrical power include, but are not limited to, a battery system and a mud turbine generator powered by the flow of the drilling fluid.

Figure 16:
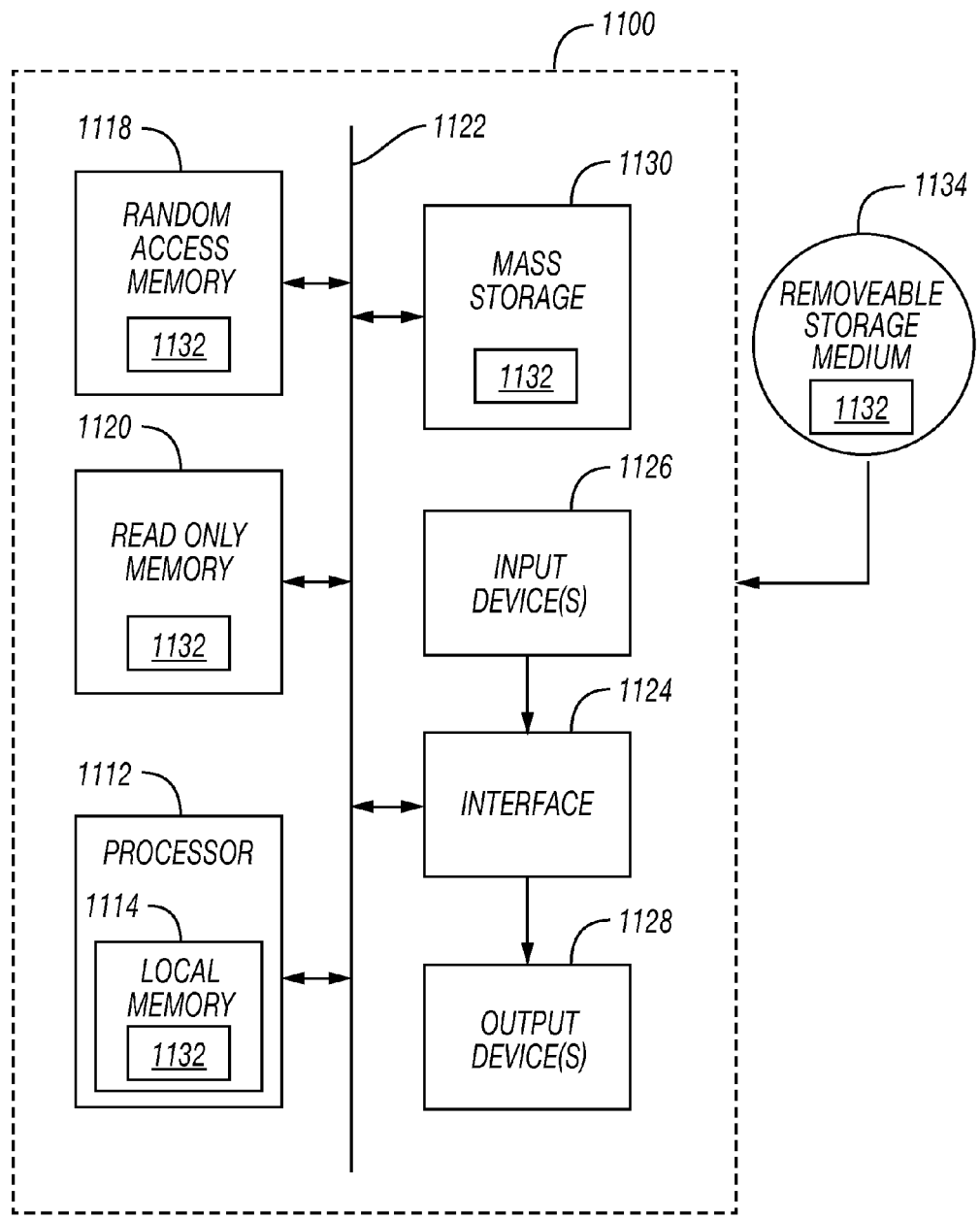
FIG. 16 is a schematic view of at least a portion of apparatus according to one or more aspects of the present disclosure.

FIG. 16 is a block diagram of an example processing system 1100 that may execute example machine-readable instructions used to implement one or more of the methods and/or processes described herein, and/or to implement the example downhole tools described herein. The processing system 1100 may be at least partially implemented in one or more of the downhole tools 705 and/or components 720 shown in FIG. 14, in one or more of the downhole tools 820, 830, and/or 850 shown in FIG. 15, in one or more surface equipment components (e.g., the logging and control system and/or other surface equipment 760 shown in FIG. 14, the logging and control system and/or other surface equipment 860 shown in FIG. 15, and/or one or more components thereof), and/or in some combination thereof. The processing system 1100 may be or comprise, for example, one or more processors, one or more controllers, one or more special-purpose computing devices, one or more servers, one or more personal computers, one or more personal digital assistant (PDA) devices, one or more smartphones, one or more internet appliances, and/or any other type(s) of computing device(s).

The system 1100 comprises a processor 1112 such as, for example, a general-purpose programmable processor. The processor 1112 includes a local memory 1114, and executes coded instructions 1132 present in the local memory 1114 and/or in another memory device. The processor 1112 may execute, among other things, machine-readable instructions to implement the methods and/or processes described herein. The processor 1112 may be, comprise or be implemented by any type of processing unit, such as one or more INTEL microprocessors, one or more microcontrollers from the ARM and/or PICO families of microcontrollers, one or more embedded soft/hard processors in one or more FPGAs, etc. Of course, other processors from other families are also appropriate.

The processor 1112 is in communication with a main memory including a volatile (e.g., random access) memory 1118 and a non-volatile (e.g., read-only) memory 1120 via a bus 1122. The volatile memory 1118 may be, comprise, or be implemented by static random access memory (SRAM), synchronous dynamic random access memory (SDRAM), dynamic random access memory (DRAM), RAMBUS dynamic random access memory (RDRAM) and/or any other type of random access memory device. The non-volatile memory 1120 may be, comprise, or be implemented by flash memory and/or any other desired type of memory device. One or more memory controllers (not shown) may control access to the main memory 1118 and/or 1120.

The processing system 1100 also includes an interface circuit 1124. The interface circuit 1124 may be, comprise, or be implemented by any type of interface standard, such as an Ethernet interface, a universal serial bus (USB) and/or a third generation input/output (3GIO) interface, among others.

One or more input devices 1126 are connected to the interface circuit 1124. The input device(s) 1126 permit a user to enter data and commands into the processor 1112. The input device(s) may be, comprise or be implemented by, for example, a keyboard, a mouse, a touchscreen, a track-pad, a trackball, an isopoint and/or a voice recognition system, among others.

One or more output devices 1128 are also connected to the interface circuit 1124. The output devices 1128 may be, comprise, or be implemented by, for example, display devices (e.g., a liquid crystal display or cathode ray tube display (CRT), among others), printers and/or speakers, among others. Thus, the interface circuit 1124 may also comprise a graphics driver card.

The interface circuit 1124 also includes a communication device such as a modem or network interface card to facilitate exchange of data with external computers via a network (e.g., Ethernet connection, digital subscriber line (DSL), telephone line, coaxial cable, cellular telephone system, satellite, etc.).

The processing system 1100 also includes one or more mass storage devices 1130 for storing machine-readable instructions and data. Examples of such mass storage devices 1130 include floppy disk drives, hard drive disks, compact disk drives and digital versatile disk (DVD) drives, among others.

The coded instructions 1132 may be stored in the mass storage device 1130, the volatile memory 1118, the non-volatile memory 1120, the local memory 1114 and/or on a removable storage medium, such as a CD or DVD 1134.

Instead of implementing the methods and/or apparatus described herein in a system such as the processing system of FIG. 16, the methods and or apparatus described herein may be embedded in a structure such as a processor and/or an ASIC (application specific integrated circuit).

In view of the entirety of the present disclosure, a person having ordinary skill in the art should readily recognize that the present disclosure introduces a method comprising: acquiring borehole image data utilizing a downhole tool conveyed within a borehole extending into a subterranean formation, wherein the downhole tool is in communication with surface equipment disposed at a wellsite surface from which the borehole extends; and operating at least one of the downhole tool and the surface equipment to: delineate a dip and/or a fracture from the acquired borehole image data; create a gap-filled image from the acquired borehole image data; extract a fracture segment from the acquired borehole image data; determine matrix information from the acquired borehole image data; delineate a heterogeneity from the acquired borehole image data; and analyze image porosity based on: the dip and/or fracture delineated from the acquired borehole image data; the gap-filled image created from the acquired borehole image data; the fracture segment extracted from the acquired borehole image data; the matrix information determined from the acquired borehole image data; and the heterogeneity delineated from the acquired borehole image data.

Performing dip and/or fracture delineation may comprise delineating bedding planes on the borehole image data.

Performing the gap-filled image creation may comprise utilizing a multipoint statistics (MPS) algorithm to fill gaps in the borehole image data.

Performing the fracture segment extraction may comprise automatic segment extraction.

Performing the heterogeneity delineation may comprise automatically delineating the heterogeneity.

Performing the heterogeneity delineation may comprise characterizing geometric and/or electrical properties of the delineated heterogeneity and a corresponding connectedness intensity.

Performing the heterogeneity delineation may comprise delineating a plurality of conductive and/or resistive heterogeneities.

Performing the heterogeneity delineation may comprise automatically classifying the heterogeneity by superimposing results of performing one or more of the dip and/or fracture delineation and the fracture segment extraction.

Performing the image porosity analysis may comprise determining a porosity map based on a conductivity borehole image.

Determining the matrix information may comprise utilizing a grayscale reconstruction transform.

Determining the matrix information may comprise identifying non-crossing features in the borehole image data. The identified non-crossing features may comprise at least one of vugs, molds, fracture segments, and/or intraformational conglomerates.

Determining the matrix information may comprise removing conductive heterogeneities and resistive heterogeneities from the acquired borehole image data, thus leaving the matrix information.

The method may further comprise determining a curve representing a property of the matrix information by averaging the matrix information with respect to depth in the borehole, and analyzing the image porosity may be further based on the curve representing the property of the matrix information.

The method may further comprise operating at least one of the downhole tool and the surface equipment to preprocess the borehole image data before delineating the dip and/or fracture, creating the gap-filled image, and extracting the fracture segment, and preprocessing the borehole image data may comprise at least one of fixing erratic values, matching image depth, and calibrating image values.

The present disclosure also introduces an apparatus comprising: a downhole tool operable for conveyance within a borehole extending into a subterranean formation, and for acquiring borehole image data from within the borehole; and surface equipment disposed at a wellsite surface from which the borehole extends, and in communication with the downhole tool, wherein at least one of the downhole tool and the surface equipment is operable to: delineate a dip and/or a fracture from the acquired borehole image data; create a gap-filled image from the acquired borehole image data; extract a fracture segment from the acquired borehole image data; determine matrix information from the acquired borehole image data; delineate heterogeneity from the acquired borehole image data; and analyze image porosity based on: the dip and/or fracture delineated from the acquired borehole image data; the gap-filled image created from the acquired borehole image data; the fracture segment extracted from the acquired borehole image data; the matrix information determined from the acquired borehole image data; and the heterogeneity delineated from the acquired borehole image data.

The present disclosure also introduces an apparatus comprising: a processor; and memory including computer program code; wherein the processor, the memory, and the computer program code are collectively operable to: delineate a dip and/or a fracture from borehole image data; create a gap-filled image from the borehole image data; extract a fracture segment from the borehole image data; determine matrix information from the borehole image data; delineate heterogeneity from the borehole image data; and analyze image porosity based on: the dip and/or fracture delineated from the borehole image data; the gap-filled image created from the borehole image data; the fracture segment extracted from the borehole image data; the matrix information determined from the borehole image data; and the heterogeneity delineated from the borehole image data.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same intents and/or achieving the same aspects introduced herein. Those skilled in the art should also realize that such equivalent constructions do not depart from the spirit and scope of the present disclosure, and that they may make various changes, substitutions and alterations herein without departing from the spirit and scope of the present disclosure. For example, although the preceding description has been described herein with reference to particular means, materials and embodiments, it is not intended to be limited to the particulars disclosed herein; rather, it extends to functionally equivalent structures, methods, and uses, such as are within the scope of the appended claims.

The Abstract at the end of this disclosure is provided to comply with 37 C.F.R. § 1.72(b) to permit the reader to quickly ascertain the nature of the technical disclosure. It is submitted with the understanding that it will not be used to interpret or limit the scope or meaning of the claims.

What is claimed is:

1. A method (100), comprising:
  acquiring borehole image data utilizing a downhole tool conveyed within a borehole extending into a subterranean formation, wherein the downhole tool is in communication with surface equipment disposed at a wellsite surface from which the borehole extends; and
  operating at least one of the downhole tool and the surface equipment to:
    delineate (120) a dip and/or a fracture from the acquired borehole image data;
    create (130) a gap-filled image from the acquired borehole image data;

extract (140) a fracture segment from the acquired borehole image data;
determine (150) matrix information from the acquired borehole image data;
delineate (160) a heterogeneity from the acquired borehole image data; and
analyze (170) image porosity based on:
the dip and/or fracture delineated (120) from the acquired borehole image data;
the gap-filled image created (130) from the acquired borehole image data;
the fracture segment extracted (140) from the acquired borehole image data;
the matrix information determined (150) from the acquired borehole image data; and
the heterogeneity delineated (160) from the acquired borehole image data.

2. The method of claim 1 wherein performing dip and/or fracture delineation comprises delineating bedding planes on the borehole image data.

3. The method of claim 1 wherein performing the gap-filled image creation comprises utilizing a multipoint statistics (MPS) algorithm to fill gaps in the borehole image data.

4. The method of claim 1 wherein performing the fracture segment extraction comprises automatic segment extraction.

5. The method of claim 1 wherein performing the heterogeneity delineation comprises automatically delineating the heterogeneity.

6. The method of claim 1 wherein performing the heterogeneity delineation comprises characterizing geometric and/or electrical properties of the delineated heterogeneity and a corresponding connectedness intensity.

7. The method of claim 1 wherein performing the heterogeneity delineation comprises delineating a plurality of conductive and/or resistive heterogeneities.

8. The method of claim 1 wherein performing the heterogeneity delineation comprises automatically classifying the heterogeneity by superimposing results of performing one or more of the dip and/or fracture delineation and the fracture segment extraction.

9. The method of claim 1 wherein performing the image porosity analysis comprises determining a porosity map based on a conductivity borehole image.

10. The method of claim 1 wherein determining the matrix information comprises utilizing a grayscale reconstruction transform.

11. The method of claim 1 wherein determining the matrix information comprises identifying non-crossing features in the borehole image data.

12. The method of claim 11 wherein the identified non-crossing features comprise at least one of vugs, molds, fracture segments, and/or intraformational conglomerates.

13. The method of claim 1 wherein determining the matrix information comprises removing conductive heterogeneities and resistive heterogeneities from the acquired borehole image data, thus leaving the matrix information.

14. The method of claim 13 further comprising determining a curve representing a property of the matrix information by averaging the matrix information with respect to depth in the borehole, wherein analyzing (170) the image porosity is further based on the curve representing the property of the matrix information.

15. The method of claim 1 further comprising operating at least one of the downhole tool and the surface equipment to preprocess the borehole image data before delineating the dip and/or fracture, creating the gap-filled image, and extracting the fracture segment, wherein preprocessing the borehole image data comprises at least one of fixing erratic values, matching image depth, and calibrating image values.

16. The method of claim 1 wherein:
performing dip and/or fracture delineation comprises delineating bedding planes on the borehole image data;
performing the gap-filled image creation comprises utilizing a multipoint statistics (MPS) algorithm to fill gaps in the borehole image data;
performing the fracture segment extraction comprises automatic segment extraction;
performing the heterogeneity delineation comprises:
automatically delineating the heterogeneity;
characterizing geometric and/or electrical properties of the delineated heterogeneity and a corresponding connectedness intensity;
delineating a plurality of conductive and/or resistive heterogeneities; and
automatically classifying the heterogeneity by superimposing results of performing one or more of the dip and/or fracture delineation and the fracture segment extraction;
performing the image porosity analysis comprises determining a porosity map based on a conductivity borehole image;
determining the matrix information comprises:
utilizing a grayscale reconstruction transform;
identifying non-crossing features in the borehole image data, wherein the identified non-crossing features comprise at least one of vugs, molds, fracture segments, and/or intraformational conglomerates; and
removing conductive heterogeneities and resistive heterogeneities from the acquired borehole image data, thus leaving the matrix information; and
the method further comprises:
determining a curve representing a property of the matrix information by averaging the matrix information with respect to depth in the borehole, wherein analyzing (170) the image porosity is further based on the curve representing the property of the matrix information; and
operating at least one of the downhole tool and the surface equipment to preprocess the borehole image data before delineating the dip and/or fracture, creating the gap-filled image, and extracting the fracture segment, wherein preprocessing the borehole image data comprises at least one of fixing erratic values, matching image depth, and calibrating image values.

17. An apparatus, comprising:
a downhole tool operable for conveyance within a borehole extending into a subterranean formation, and for acquiring borehole image data from within the borehole; and
surface equipment disposed at a wellsite surface from which the borehole extends, and in communication with the downhole tool, wherein at least one of the downhole tool and the surface equipment is operable to:
delineate (120) a dip and/or a fracture from the acquired borehole image data;
create (130) a gap-filled image from the acquired borehole image data;
extract (140) a fracture segment from the acquired borehole image data;
determine (150) matrix information from the acquired borehole image data;
delineate (160) heterogeneity from the acquired borehole image data; and analyze (170) image porosity based on:
the dip and/or fracture delineated (120) from the acquired borehole image data;
the gap-filled image created (130) from the acquired borehole image data;
the fracture segment extracted (140) from the acquired borehole image data;
the matrix information determined (150) from the acquired borehole image data; and
the heterogeneity delineated (160) from the acquired borehole image data.

18. The apparatus of claim 17 wherein:
performing dip and/or fracture delineation comprises delineating bedding planes on the borehole image data;
performing the gap-filled image creation comprises utilizing a multipoint statistics (MPS) algorithm to fill gaps in the borehole image data;
performing the fracture segment extraction comprises automatic segment extraction;
performing the heterogeneity delineation comprises:
automatically delineating the heterogeneity;
characterizing geometric and/or electrical properties of the delineated heterogeneity and a corresponding connectedness intensity;
delineating a plurality of conductive and/or resistive heterogeneities; and
automatically classifying the heterogeneity by superimposing results of performing one or more of the dip and/or fracture delineation and the fracture segment extraction;
performing the image porosity analysis comprises determining a porosity map based on a conductivity borehole image;
determining the matrix information comprises:
utilizing a grayscale reconstruction transform;
identifying non-crossing features in the borehole image data, wherein the identified non-crossing features comprise at least one of vugs, molds, fracture segments, and/or intraformational conglomerates; and
removing conductive heterogeneities and resistive heterogeneities from the acquired borehole image data, thus leaving the matrix information; and
at least one of the downhole tool and the surface equipment is further operable to:
determine a curve representing a property of the matrix information by averaging the matrix information with respect to depth in the borehole, wherein analyzing (170) the image porosity is further based on the curve representing the property of the matrix information; and
preprocess the borehole image data before delineating the dip and/or fracture, creating the gap-filled image, and extracting the fracture segment, wherein preprocessing the borehole image data comprises at least one of fixing erratic values, matching image depth, and calibrating image values.

19. An apparatus, comprising:
a processor; and
memory including computer program code;
wherein the processor, the memory, and the computer program code are collectively operable to:
delineate (120) a dip and/or a fracture from borehole image data;
create (130) a gap-filled image from the borehole image data;
extract (140) a fracture segment from the borehole image data;
determine (150) matrix information from the borehole image data;
delineate (160) heterogeneity from the borehole image data; and
analyze (170) image porosity based on:
the dip and/or fracture delineated (120) from the borehole image data;
the gap-filled image created (130) from the borehole image data;
the fracture segment extracted (140) from the borehole image data;
the matrix information determined (150) from the borehole image data; and
the heterogeneity delineated (160) from the borehole image data.

20. The apparatus of claim 19 wherein:
performing dip and/or fracture delineation comprises delineating bedding planes on the borehole image data;
performing the gap-filled image creation comprises utilizing a multipoint statistics (MPS) algorithm to fill gaps in the borehole image data;
performing the fracture segment extraction comprises automatic segment extraction;
performing the heterogeneity delineation comprises:
automatically delineating the heterogeneity;
characterizing geometric and/or electrical properties of the delineated heterogeneity and a corresponding connectedness intensity;
delineating a plurality of conductive and/or resistive heterogeneities; and
automatically classifying the heterogeneity by superimposing results of performing one or more of the dip and/or fracture delineation and the fracture segment extraction;
performing the image porosity analysis comprises determining a porosity map based on a conductivity borehole image;
determining the matrix information comprises:
utilizing a grayscale reconstruction transform;
identifying non-crossing features in the borehole image data, wherein the identified non-crossing features comprise at least one of vugs, molds, fracture segments, and/or intraformational conglomerates; and
removing conductive heterogeneities and resistive heterogeneities from the acquired borehole image data, thus leaving the matrix information; and
the processor, the memory, and the computer program code are collectively further operable to:
determine a curve representing a property of the matrix information by averaging the matrix information with respect to depth in the borehole, wherein analyzing (170) the image porosity is further based on the curve representing the property of the matrix information; and
preprocess the borehole image data before delineating the dip and/or fracture, creating the gap-filled image, and extracting the fracture segment, wherein preprocessing the borehole image data comprises at least one of fixing erratic values, matching image depth, and calibrating image values.

\* \* \* \* \*